United States Patent
Ley

[15] 3,655,956
[45] Apr. 11, 1970

[54] DENSITY MEASUREMENTS

[72] Inventor: Anthony John Ley, Farnborough, England

[73] Assignee: The Solartron Electronic Group Limited, Farnborough, England

[22] Filed: July 13, 1970

[21] Appl. No.: 54,136

[30] Foreign Application Priority Data

July 17, 1969 Great Britain..................36,159/69

[52] U.S. Cl..................235/151.3, 73/194 E, 235/150.3, 235/151.34, 235/197, 235/92 MT
[51] Int. Cl...................................G06f 15/56, G06f 15/34
[58] Field of Search.................73/30, 32, 194 R, 194 E, 195, 73/206, 438; 235/150.3, 150.31, 151.3, 151.34, 164, 180, 182, 197, 150.5, 150.52, 150.53

[56] References Cited

UNITED STATES PATENTS

| | | | |
|---|---|---|---|
| 3,283,129 | 11/1966 | Kelling | 235/164 X |
| 3,414,720 | 12/1968 | Battarel | 235/164 |
| 3,512,410 | 5/1970 | Vander Heyden | 73/194 R |
| 3,529,138 | 9/1970 | Andre et al. | 235/197 X |
| 3,564,535 | 2/1971 | Ward et al. | 235/197 X |

Primary Examiner—Eugene G. Botz
Assistant Examiner—Jerry Smith
Attorney—William R. Sherman, Stewart F. Mooore, Jerry M. Presson and Arnold, Roylance, Kruger and Durkee

[57] ABSTRACT

The output of a frequency domain density meter is linearized by feeding clock pulses via a first preset binary rate multiplier to a second binary rate multiplier whose gating logic is set by its own contents, thereby to effect squaring of the contents. Within one period of the density meter output, the output pulses from both binary rate multipliers are accumulated together, commencing when the contents of the second multiplier reach a preset value and until the end of the period. It is shown that the accumulated count can be arranged to represent a linear function of density.

7 Claims, 2 Drawing Figures

DENSITY MEASUREMENTS

This invention relates to density measurements effected by means of density transducers which operate on the natural resonance frequency principle and which have a quadratic relationship between density $\rho$ of a fluid medium in which the transducer is immersed and $\Delta t$, where $\Delta t$ is the difference between the periods of a signal derived from the transducer when the density equals $\rho$ and when the density is zero or some other datum value.

For example, known liquid density meters have a density versus frequency ($f$) relationship $$\rho = \rho_0 \left[ \frac{f_0^2}{f^2} - 1 \right] \quad (1)$$

where $f_0$ is the frequency at zero density and $\rho_0$ is a constant. Putting $f = 1/t$, whence $\Delta t = t - 1/f_0$, we have from (1)

$$\rho = \rho_0 ( 2f_0 \Delta t + f_0^2 \Delta t^2 ) \quad (2)$$

It can readily be shown that equation (2), with suitably modified constants, is equally applicable to measuring $\Delta \rho = \rho - \rho^1$ where $\rho^1$ is a datum value other than zero, and similar comments apply to the equations next discussed.

Known gas density meters have a slightly more complex relationship:

$$\rho = \rho_0 \left[ \frac{f_1^2}{f^2} + \frac{f^2}{f_2^2} - 1 \right] \quad (3)$$

where $\rho_0, f_1$ and $f_2$ are constants.

Equation (3) can be manipulated to the form $$\rho = \rho_A (2f_0 \Delta t + f_A^2 \Delta t^2) \quad (4)$$

where $$\rho_A = \rho_0 \sqrt{\frac{f_2^2 + 4f_1^2}{2f_0}}$$

and $$f_A = 2f_0 f_1^2 / \sqrt{f_2^2 + 4f_1^2}$$

Equations (2) and (4) are identical in form and the object of this invention is to provide apparatus adapted to provide a digital measure of $\rho$ (or $\Delta \rho$) when such quadratic relationships exist.

The invention relies upon digital techniques and in particular upon binary rate multipliers. A binary rate multiplier is well known in the art (see for example "The Digital Differential Analyser", edited by T. R. H. Sizer, Chapman and Hall, 1968), and comprises a binary counter with associated gating logic for selecting outputs from different combinations of stages of the counter, whereby the combined outputs from the selected stages provide a number of pulses which is scaled down with reference to the number of input pulses by a factor determined by which combination of stages is selected. The gating or selection logic thus introduces a variable transmission ratio between the input pulses and the output pulses and, for this reason, in the subsequent detailed description, the term "gearbox" is used for this logic.

According to the invention, apparatus for providing a digital density measurement in response to a signal whose period $t$ equals $t_0 + \Delta t$ and where an equation of the form of (2) applies, comprises a first binary counter and first presettable gearbox operative in the first part of a period $t$ to scale down clock pulses and provide output pulses to a second binary counter, the second counter having an associated second gearbox whose gates are selected by stages of the second counter itself, whereby the number of output pulses from the second gearbox is proportional to the square of the number of input pulses to the second counter, and a third binary counter arranged to count the total number of output pulses from the first and second gearboxes from the time that the number in the second counter reaches a predetermined value until the end of the period $t$.

The apparatus preferably also includes a buffer register or staticizer to which it is arranged to transfer the contents of the third counter at the end of the period $t$. The buffer register or staticizer can be used to select the gates of a third selection logic circuit associated with a fourth counter to which are applied pulses from a flowmeter of the type which produces pulses at a rate proportional to the volume flow rate, whereby the output pulses from the said third logic circuit represent mass flow rate. Such flowmeters are turbine flowmeters and positive displacement meters.

On the other hand, differential pressure meters provide a signal proportional to $\sqrt{h/\rho}$, where $h$ is the differential pressure. Such meters can be connected to a circuit which will provide pulses at a rate proportional to volume flow rate, these pulses then being applied to the fourth counter.

A particular advantage of the invention lies in the ease with which the apparatus can be modified to deal with either equation (2) or (4). Thus in a development of the invention a fourth presettable selection logic circuit, additional to the said second logic circuit, is associated with the second counter and a fifth presettable selection logic circuit is associated with the third counter, each of these fourth and fifth circuits being so arranged that each output pulse therefrom prevents the next input pulse to the associated counter from being counted and each being arranged to be so operative only from the time that the number in the second counter reaches the predetermined value until the end of the period $t$. It will be shown below how this addition enables scaling factors to be introduced appropriate to whichever equation applies.

The invention will be further described, by way of example, with reference to the accompanying drawings, in which.

Figure 1:
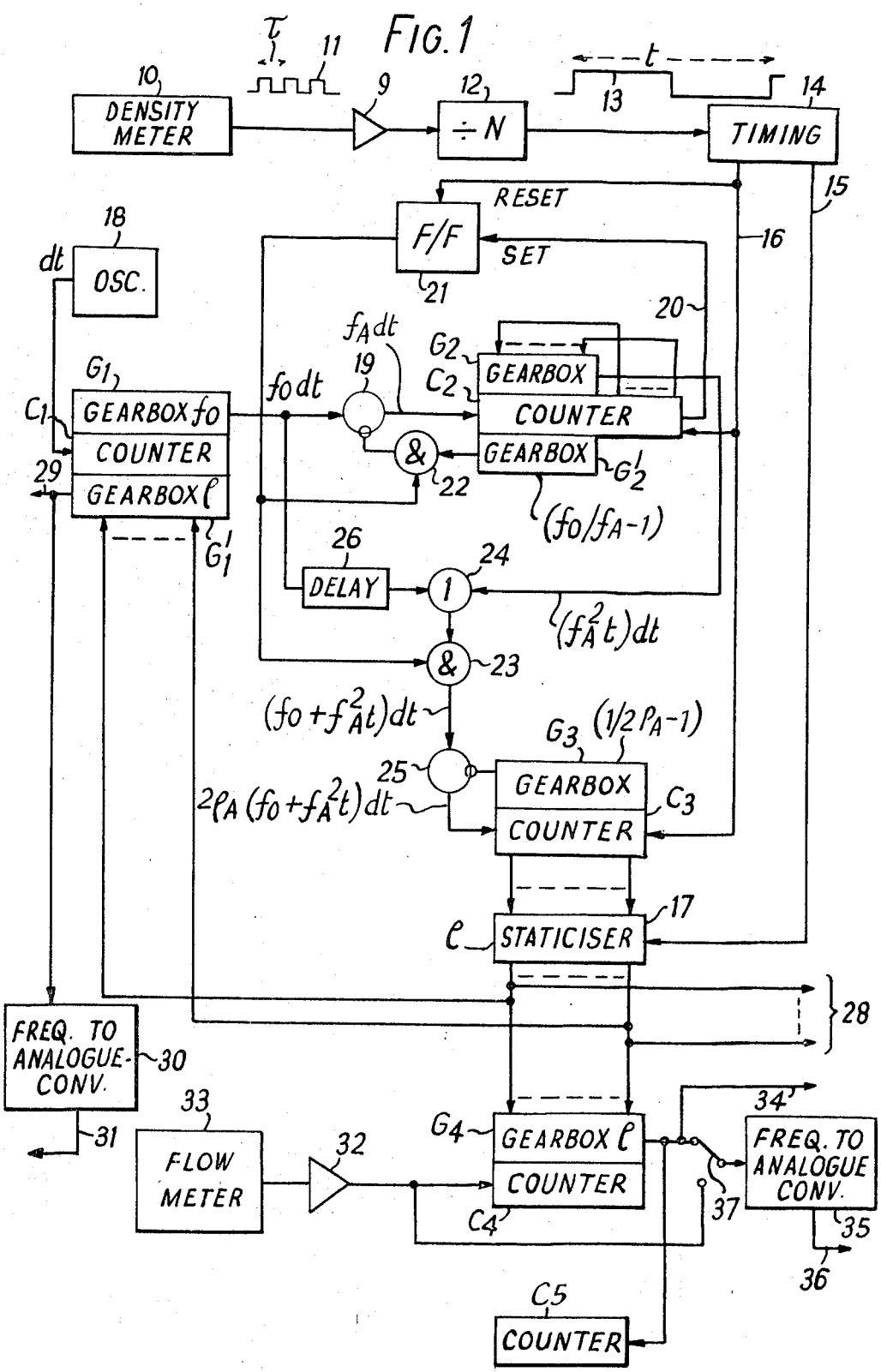
FIG. 1 is a block diagram of one embodiment of the invention.

In FIG. 1 a known liquid or gas density meter 10 provides output pulses 11 with a repetition period of $\tau$. $\tau$ will generally be too short to effect a satisfactory computation of $\rho$ and therefore the pulses 11 are applied through an input amplifier 9 to a divide-by-N circuit 12, where N lies typically in the range $2^5$ to $2^8$ and can be preset depending upon the frequency band in which the meter 10 operates. The output pulses 13 from the circuit 12 have period $t = N\tau = t_0 + \Delta t$ and are applied to a conventional timing circuit 14 which produces two pulses at the end of each period $t$ namely a staticise pulse on line 15 immediately followed by a reset pulse on line 16.

The staticize pulse causes the newly computed value of $\rho$ to be transferred from a counter $C_3$ to a staticizer or buffer register 17. The reset pulse then resets the counter $C_3$ and also a counter $C_2$.

A crystal oscillator 18, running at 1MHz for example, feeds pulses to a binary counter $C_1$ and these pulses represent the incremental time variable $dt$. The counter $C_1$ has an associated gearbox $G_1$ which is presettable (in known manner) to select gates therein and thereby set up the required value of $f_0$. The output pulses from the gearbox $G_1$ thus represent $f_0 dt$ and are applied through a gate 19, which is necessarily open in this first phase of operation, to the counter $C_2$, which thus accumulates $f_0 t$. When the number in $C_2$ reaches 1, we have $t = 1/f_0$, i.e. $t = t_0$. The counter $C_2$ then issues a pulse on line 20, which sets a bistable flip-flop 21. This flip-flop is reset by the reset pulse on line 16 and its set state therefore defines the interval $\Delta t$. During this interval, i.e. the second phase of operation, the flip-flop 21 opens two gates 22 and 23.

The gate 23 allows the output pulses from both the gearbox $G_1$ and a gearbox $G_2$ as combined by an OR gate 24 to pass through a gate 25 to the counter $C_3$. A short ($0.5\mu$ s) delay 26 ensures that pulses from the two gearboxes are applied to the OR gate 24 out of phase, and thus cannot mask each other.

The counter $C_2$ has two gearboxes associated therewith, namely the abovementioned gearbox $G_2$ and a gearbox $G'_2$. The gearbox $G'_2$ is preset to a value $(f_0/f_A - 1)$ and each output pulse therefrom passes through the gate 22, when this is open during the second phase of operation. Each such output pulse inhibits the gate 19 and is timed to blank out one pulse in the signal $f_0 dt$. The effect of this is that the input to the counter $C_2$ becomes $f_A dt$ instead of $f_0 dt$.

This can be seen by putting the output of the gate 19 equal to A. It follows that $A = f_0 dt - A(f_0/f_A - 1)$ whence $A = f_A dt$.

The gearbox $G_2$ is not a preset gearbox but the gates therein are selected by the more significant stages of the counter $C_2$ and control the selection of outputs from the less significant stages of the counter $C_2$. Since the input to the counter $C_2$ in the second phase of operation is $f_A dt$ and the counter thus accumulates $f_A t$ and since the gearbox $G'_2$ scales by $f_A t$ the output pulses from the gearbox $G_2$ represent $f_A^2 t dt$. Therefore the pulses applied to the gate 25 represent $(f_o + f_A^2 t) dt$.

The pulses applied to the counter $C_3$ are caused to represent $2\rho_A (f_o + f_A^2 t) dt$ and therefore the count accumulated in the counter $C_3$ represents $\rho_A (2f_o t = f_A^2 t^2)$. Thus the counter performs an integrating function and we have $$\int_0^{\Delta t} 2\rho_A (f_o + f_A^2 t) dt = \left[ 2\rho_A (f_o t + \tfrac{1}{2} f_A^2 t^2) \right]_0^{\Delta t}$$
$$= \rho_A (2 f_o \Delta t + f_A^2 \Delta t^2)$$
$$= \rho \text{ (from equation (4))}.$$

The scaling factor $2\rho_A$ in the input to the counter $C_3$ is introduced by a gearbox $G_3$ associated with the counter $C_3$ and preset to a value $(\tfrac{1}{2}\rho_A - 1)$. The output pulses from this gearbox are applied to inhibit the gate 25. If therefore the input to the counter $C_3$ is put equal to B it follows that $$B = (f_o + f_A^2 t) dt - (\tfrac{1}{2}\rho_A - 1) B$$

whence $$B = 2\rho_A (f_o + f_A^2 t) dt$$

When equation (2) is appropriate rather than equation (4), it is merely necessary to set $f_A = f_o$ and $\rho_A = \rho_o$. Thus the gearbox $G_2$ is preset to zero and the gearbox $G_3$ is preset to $(\tfrac{1}{2}\rho_o - 1)$.

It will be understood that the blanking function of the gearboxes $G'_2$ and $G_3$ can be achieved by using each output pulse therefrom to set a corresponding bistable flip-flop which inhibits the corresponding gate 19 or 25. The next pulse arriving from the gearbox $G_1$ or the gate 23 is unable to pass through the gate but it does reset the corresponding flip-flop so that only one pulse is blocked by the gate 19 or 25 as the case may be.

The value of $\rho$ thus computed is held in the staticiser 17 during the following period and can be used as required. A direct binary readout is available on lines 28 which also control another gearbox $G'_1$ associated with the counter $C_1$. The output pulses from the gearbox $G'_1$ represent $\rho dt$ and are available on line 29 as a frequency analogue of the density value. The line 29 is also connected to a frequency to analogue converter 30 which provides an analogue signal representing $\rho$ on an output line 31.

In order to determine mass flow the staticiser 17 also controls a gearbox $G_4$ whose associated counter $C_4$ receives pulses through an amplifier 32 from a turbine or positive displacement flowmeter 33. The output pulses on a line 34 represent mass flow rate and are accumulated by a counter $C_5$ to measure integrated mass flow. A frequency to analogue converter 35 provides an analogue output on line 36 representing either mass flow rate or volume flow rate, depending on the setting of a switch 37.

Figure 2:
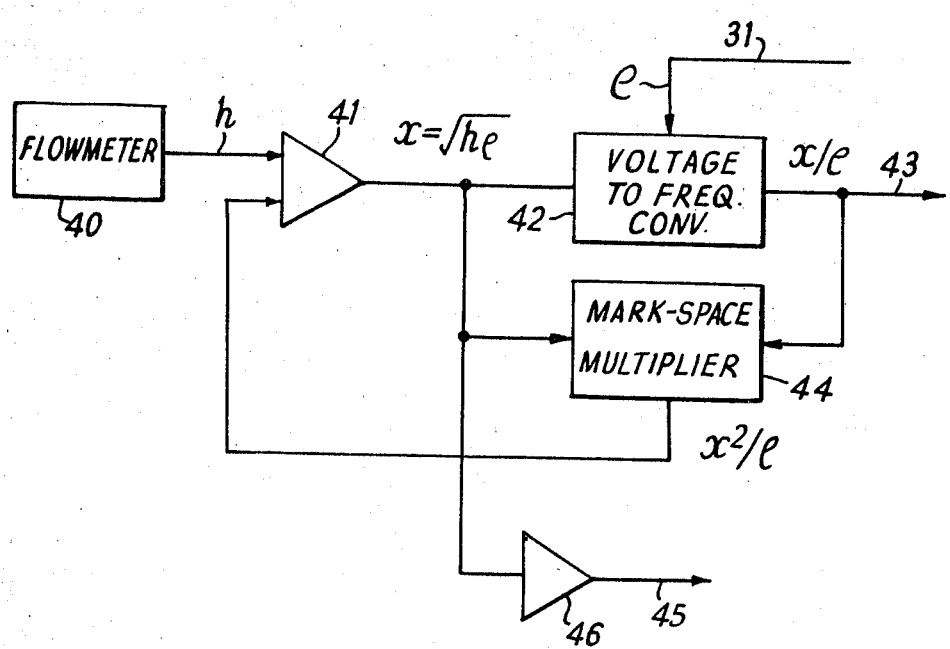
FIG. 2 shows a circuit for use in conjunction with FIG. 1 when a differential pressure type volume flow meter is used.

If a differential pressure type (orifice plate) flowmeter is used, volumetric flow rate $dv/dt = K \sqrt{h/\rho}$ where $K$ is a constant and $h$ is the differential pressure. The input to the counter $C_4$ can then be provided by the circuit shown in FIG. 2. The flowmeter 40 provides an analogue signal $h$ which is applied to one input of a differential amplifier 41. The output of this amplifier will be denoted $x$ and is applied to a voltage to frequency converter 42. An analogue signal $\rho$ from the line 31 (FIG. 1) is also applied to the converter 42 which is arranged to produce pulses on a line 43 representing $x/\rho$. The converter 42 can take various forms, e.g. an integrating circuit with negative feedback of a unit of charge every time the output exceeds a threshold level, the magnitude of the units of feedback charge being determined by the analogue voltage $\rho$ and a pulse being provided on the line 43 every time a unit of charge is fed back. In other words the converter would be a well known type of digital voltmeter with $\rho$ substituted for the customary reference voltage. Also, $x$ and $x/\rho$ are applied to a mark-space multiplier 44 which provides an analogue output $x^2/\rho$. This signal constitutes the other input to the differential amplifier 41 and accordingly the system stabilizes with $h = x^2/\rho$ and hence $x = \sqrt{h\rho}$, which is proportional to $\rho \sqrt{h/\rho}$, i.e. $\rho(dv/dt)$, i.e. the mass flow rate. Therefore an analogue representation of mass flow rate can be obtained on a line 45 connected to the output of the differential amplifier 41 through an output amplifier 46. On the other hand the digital pulse rate signal on the line 43, namely $x/\rho$, is proportional to $\sqrt{h/\rho}$ and can therefore be used as the $dv/dt$ input to the counter $C_4$.

I claim:

1. An apparatus for providing a digital representation of a fluid density measurement comprising a source of clock pulses; multiplier means including a first binary counter and first logic circuit means connected to said source of clock pulses for providing a first series of output pulses equal to the number of clock pulses multiplied by a factor; means including a second binary counter and second logic circuit means for accepting said first series of output pulses and for producing a second series of output pulses proportional in number to the square of the number of pulses in said first series; a third counter connected to receive and count the total number of pulses in said first and second series of pulses; and means connected to said third counter to permit counting thereby only during a preselected period.

2. Apparatus according to claim 1 wherein the fluid density measurement is in the form of a series of signals each having a period T and said preselected period during which said third counter counts is $t$ less the time taken for said first counter to count a predetermined number of clock pulses, where $t = NT$ and $N$ is an integer.

3. Apparatus according to claim 2 wherein said apparatus further comprises a register, and means for transferring the contents of said third counter to said register at the end of each period $t$.

4. Apparatus according to claim 3 wherein said apparatus further comprises a fourth counter; logic circuit means associated with said fourth counter, said logic circuit means including means responsive to the contents of said register to place selected elements of said logic circuit means in operative states; and a source of pulses proportional to fluid flow rate, said pulses constituting an input to said fourth counter.

5. Apparatus for accepting an electrical signal representative of a fluid density measurement, the electrical signal having a period $t = t_o + 66t$ and wherein the density $\rho$ and the frequency of the electrical signal are in accordance with the relationship $$\rho = \rho_o (2 f_o \Delta t + f_o^2 \Delta t^2),$$

and for providing a digital representation of the measurement, the apparatus comprising the combination of a source of clock pulses; means including a first binary counter and first logic circuit means connected to said source of clock pulses for providing a first series of output pulses equal to the number of clock pulses multiplied by a factor; means including a second binary counter and second logic circuit means for accepting said first series of output pulses and for producing a second series of output pulses proportional in number to the square of the number of pulses in said first series; a third counter connected to receive and count the total number of pulses in said first and second series of pulses; and means connected to said third counter to permit counting thereby only during the period $t$ less the time taken for said first counter to count a predetermined number of clock pulses.

6. Apparatus according to claim 5, wherein said apparatus further comprises a register, and means for transferring the contents of said third counter to said register at the end of each period $t$, and wherein said apparatus further comprises a fourth counter; logic circuit means associated with said fourth counter, said logic circuit means including means responsive to the contents of said register to place selected elements of said logic circuit means in operative states; and a source of pulses proportional to fluid flow rate, said pulses constituting an input to said fourth counter.

7. Apparatus according to claim 5, comprising a first additional logic circuit means associated with said second counter and a second additional logic circuit means associated with said third counter, and means responsive to each output pulse from each additional means during the time commencing when the number in said second counter reaches said predetermined value and ending at the end of the period $t$ to prevent the next input pulse to the associated counter from being counted.

* * * * *

UNITED STATES PATENT OFFICE
CERTIFICATE OF CORRECTION

Patent No. 3,655,956  Dated April 11, 1972

Inventor(s) Anthony John Ley

It is certified that error appears in the above-identified patent and that said Letters Patent are hereby corrected as shown below:

On the cover sheet, [45], "April 11, 1970" should read -- April 11, 1972 --.

Signed and sealed this 31st day of October 1972.

(SEAL)
Attest:

EDWARD M. FLETCHER, JR.
Attesting Officer

ROBERT GOTTSCHALK
Commissioner of Patents